United States Patent [19]

Wingler

[11] 3,767,019
[45] Oct. 23, 1973

[54] OVER RUNNING CLUTCH
[76] Inventor: Frank J. Wingler, Route #3, P.O. Box 170-C, Headland, Ala. 36345
[22] Filed: July 21, 1971
[21] Appl. No.: 164,783

[52] U.S. Cl............ 192/45, 192/105 B, 192/105 BA
[51] Int. Cl....................... F16d 41/06, F16d 43/24
[58] Field of Search...................... 192/45, 48.92, 64, 192/44, 105 B, 105 BA; 188/82.84

[56] References Cited
UNITED STATES PATENTS

| 279,959 | 6/1883 | Lewis | 64/29 X |
|---|---|---|---|
| 1,716,750 | 6/1929 | Anderson | 192/45 |
| 531,612 | 12/1894 | Emery | 192/45 |
| 589,338 | 8/1897 | Copeland | 192/45 |
| 1,008,428 | 11/1911 | Moseson | 192/44 |
| 354,055 | 12/1886 | Goodell | 188/82.84 |
| 609,973 | 8/1898 | Neeley | 192/45 |
| 2,490,172 | 12/1949 | Swahnberg | 192/45 |
| 2,915,156 | 12/1959 | Horn | 192/45 |

Primary Examiner—Allan D. Herrmann

[57] ABSTRACT

A clutch mechanism for incorporation in machinery, the clutch being of over running type and comprising a means for transmitting rotational movement between shafts which are axile aligned with each other, the device consisting of a face plate on each end of the shafts; in one form of the invention, one of the face plates having tapered slots each of which contain a ball movable along the slot for engaging the other face plate; and in another form of the invention the peripherial edge of one of the face plates having tapered slots each of which contains a ball and wherein the balls traveling the slots engage an inner cylindrical face carried by the other face plate.

1 Claim, 4 Drawing Figures

PATENTED OCT 23 1973  3,767,019

INVENTOR.
FRANK J. WINGLER

OVER RUNNING CLUTCH

This invention relates generally to clutches.

A principal object of the present invention is to provide an over running clutch wherein contact is made between a driven shaft face plate and a driving shaft face plate, the contact being made at a radial further distance.

Another purpose of the present invention is to provide an over running clutch which accordingly will take less horse power to pull and object that is intended to be driven.

Still another object of the present invention is to provide an over running clutch which is not likely to become out of service very soon due to any heavy load placed there upon.

Still another purpose of the present invention is to provide an over running clutch wherein engaging balls between driving and driven face plates are activated by a centrifical force.

Other objects of the present invention are to provide an over running clutch which is simple in design, inexpensive to manufacture, rugged in construction, easy to use and efficient in operation.

These and other objects will be readily evident upon a study of the following specification and accompanying drawing wherein.

Figure 1:
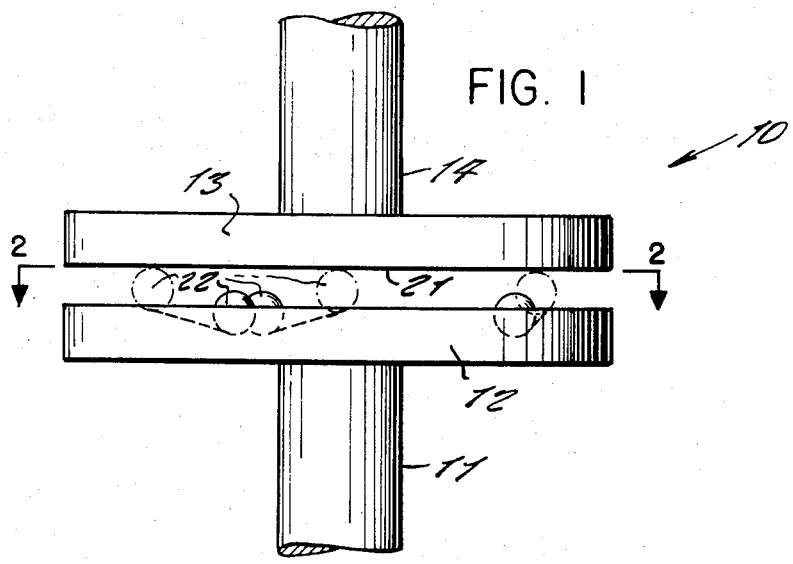
FIG. 1 is an elevation view showing one form of the present invention.
Figure 2:
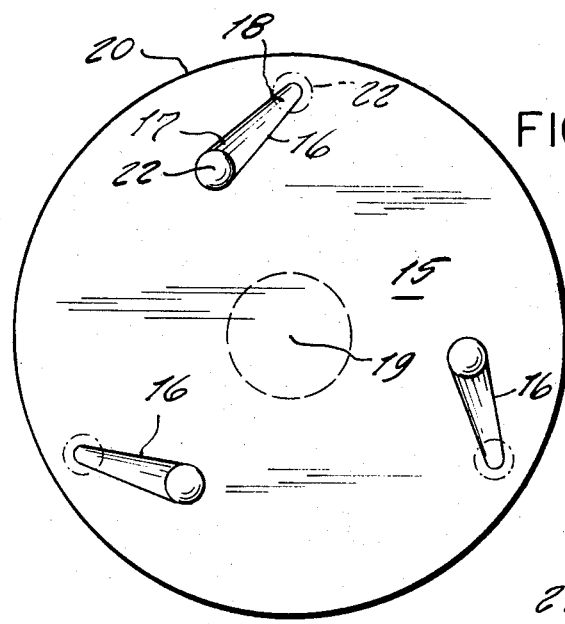
FIG. 2 is a view in a direction 2—2 of FIG. 1 and showing the clutch engaging mechanism.

Referring now to the drawing in detail, and more particularly at this time to FIGS. 1 and 2 thereof, the reference numeral 10 represents an over running clutch according to the present invention wherein there is a drive shaft 11 having a face plate 12 rigidly affixed there to which is in parallel spaced relation with a face plate 13 secured on a driven shaft 14.

The flat side 15 of the drive face plate 12 is provided with a plurality of slots 16 each one of which is tapered so that one end 17 of the slot is deeper into the face plate than the opposite end 18 of the slot. As shown in FIG. 2 of the drawing, it is to be noted that the slots 16 are arranged at a diagonal angle respective to an imaginary radial line drawen from a center 19 of the face plate toward an edge 20 thereof. It is to be further noted upon observation of FIG. 2 that the deeper end of the slot 16 is located closer to the center 19 of the face plate while the shallow opposite end 18 of the slot 16 is located further away from the center 19 of the face plate. The driven face plate 13 has an end wall 21 which is flat throughout its surface.

In operative use, it is now apparent that a ball 22 placed within each of the slots 16 will move out of the deeper inner end 17 of the slot 16 toward the outer shallower end 18 of the slot so as to engage frictionally the flat surface 21 of the driven face plate 13, such as is shown in FIG. 1 of the drawing. It is now apparent that the balls are activated by a centrifugal force in making the engagement. The centrifugal force thus brings the balls 22 to a greater radial distance away from the center 19 so to make the clutch engagement with the driven face plate surface 21.

Figure 3:
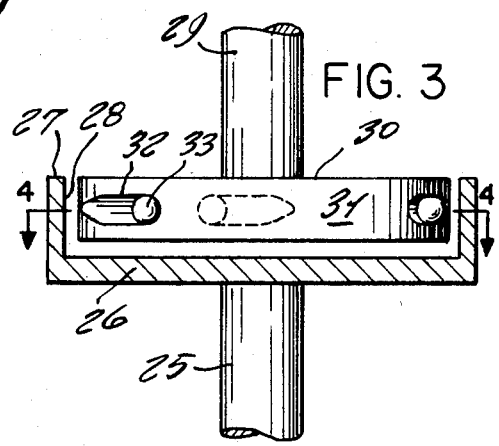
FIG. 3 is an elevation cross sectional view of a modified design of the invention.
Figure 4:
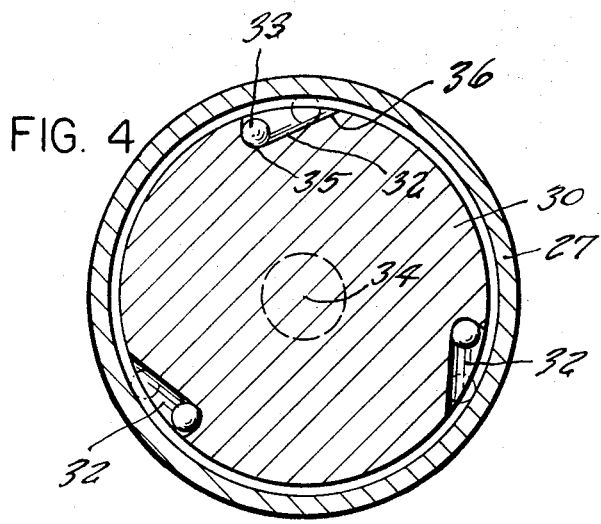
FIG. 4 is a cross sectional view taken on the line 4—4 of FIG. 3.

In FIGS. 3 and 4 of the drawing, the same principals are applied of the present invention in a modified structure of an over running clutch 24 which includes a drive shaft 25 having a bell shaped plate 26 secured there to and which is provided integral with a cylindrically extending flange 27 having an inner cylindrical side 28. There is a drive shaft 29 integral with a face plate 30 which upon its peripherial edge 31 has a series of tapered slots 32 each one of which carries a ball 33.

As shown in FIG. 4 of the drawing, each of the slots 32 extend diagonally respective to an imaginary radial extending line from a center 34 of the face plate 30, each of the slots 32 having a deeper end 35 which is located closer to the center 34 and a shallower end 36 which is further away from the center 34.

In operative use, it is now evident that centrifugal force will bring the ball 33 toward the further shallower end 36 of the slot 32 so that the ball 33 engages the cylindrical inner surface 28 so to transmit motion between the shafts 25 and 29. Thus a modified form of the invention has been provided.

What I now claim is:

1. In an over running clutch, the combination of a drive shaft and a driven shaft in axial alignment with each other, a face plate rigidly secured on one end of each said shaft, an outer face of each said face plate facing each other in spaced relation, one said face plate having on said outer face a plurality of tapered, straight slots, each said tapered slot having a spherical ball slidable therein, one end of said slots being gradually deeper than the other end thereof so to form said tapered slots, said deeper end of said slots being located relatively nearer to a center axis of said shaft while a shallow opposite end of said slots is located relatively further away from said shaft center axis, each said slot accordingly extending at an angle respective to an imaginary radial line extending from said center axis, whereby a centrifugal force caused by rotation of said shaft will throw said balls toward said slot shallow ends so that said balls frictionally engage the other said face plate, said balls being of a greater diameter than a width of a space between said face plates.

* * * * *